(12) United States Patent
Ari

(10) Patent No.: US 8,635,451 B2
(45) Date of Patent: Jan. 21, 2014

(54) TECHNIQUES TO STRENGTHEN ONE-TIME PAD ENCRYPTION

(75) Inventor: Zsolt Ari, Seattle, WA (US)

(73) Assignee: Vadium Technology, Inc., Tacoma, WA (US)

( * ) Notice: Subject to any disclaimer, the term of this patent is extended or adjusted under 35 U.S.C. 154(b) by 0 days.

(21) Appl. No.: 12/942,547

(22) Filed: Nov. 9, 2010

(65) Prior Publication Data

US 2011/0051928 A1    Mar. 3, 2011

Related U.S. Application Data

(63) Continuation of application No. 11/191,878, filed on Jul. 28, 2005, now Pat. No. 7,840,002.

(60) Provisional application No. 60/592,310, filed on Jul. 29, 2004.

(51) Int. Cl.
*H04W 48/16* (2009.01)
*H04W 8/22* (2009.01)

(52) U.S. Cl.
USPC .............................. 713/167; 713/181; 726/13

(58) Field of Classification Search
None
See application file for complete search history.

(56) References Cited

U.S. PATENT DOCUMENTS

| | | | |
|---|---|---|---|
| 6,608,828 B1 * | 8/2003 | Balachandran | 370/349 |
| 7,171,001 B2 * | 1/2007 | Tuvell et al. | 380/278 |
| 2005/0172199 A1 * | 8/2005 | Miller et al. | 714/749 |

* cited by examiner

*Primary Examiner* — Venkat Perungavoor
(74) *Attorney, Agent, or Firm* — Edward J. Radlo; Radlo IP Law Group

(57) ABSTRACT

Apparati, methods, and computer-readable media for strengthening a one-time pad encryption system. A method embodiment of the present invention comprises the steps of encrypting plaintext (1) with an OTP key (2) in an XOR operation to produce ciphertext (3); and obfuscating the ciphertext (3) with an AutoKey (4) in an XOR operation to produce AutoKeyed ciphertext (5), wherein the AutoKey (4) is a reusable key.

7 Claims, 3 Drawing Sheets

TECHNIQUES TO STRENGTHEN ONE-TIME PAD ENCRYPTION

RELATED PATENT APPLICATIONS

This patent application is a continuation of and claims priority to commonly-owned U.S. patent application Ser. No. 11/191,878 filed Jul. 28, 2005, entitled "Techniques to Strengthen One-Time Pad Encryption", which utility patent application is related to, and claims priority benefit under 35 U.S.C. §119(e) to, U.S. provisional patent application 60/592,310, entitled "Cryptographic Techniques," filed Jul. 29, 2004, both of which patent applications are hereby incorporated by reference in their entireties into the present continuation patent application.

TECHNICAL FIELD

This invention pertains to the field of encryption systems using a one-time pad (OTP).

BACKGROUND ART

U.S. published patent application no. US 2004/0017917 A1, entitled "Cryptographic Key Distribution Using Key Folding," published Jan. 29, 2004, and U.S. published patent application no. US 2004/0136537 A1, entitled "Cryptography Key Distribution Using Key Unfolding," published Jul. 15, 2004, pertain to improving the distribution of keys used in a one-time pad encryption system. The present invention pertains to strengthening the one-time pad encryption system itself.

DISCLOSURE OF INVENTION

Apparati, methods, and computer-readable media for strengthening a one-time pad encryption system. A method embodiment of the present invention comprises the steps of encrypting plaintext (1) with an OTP key (2) in an XOR operation to produce ciphertext (3); and obfuscating the ciphertext (3) with an AutoKey (4) in an XOR operation to produce AutoKeyed ciphertext (5), wherein the AutoKey (4) is a reusable key.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Definitions

The following terms have the following meanings throughout the present specification, including claims.

"AK (AutoKey)" 4 means a reusable key that is used in an XOR operation in the manner described herein and for the purposes described herein.

"GUID (globally unique identifier)" 8 means a series of bits that uniquely identifies an item, in this case a KernelKey 6.

"Key identifier" means a series of bits that identifies which key 2 out of a set of keys 2 should be used for decryption in an OTP encryption system.

"Key offset" means a numerical value indicating the starting point within an OTP key 2 when the key 2 is used in an encryption or decryption procedure in an OTP encryption system.

"KK (KernelKey)" 6 means a reusable key that is used in an XOR operation in the manner described herein and for the purposes described herein.

"Obfuscate" means the use of a reusable key, such as an AK 4 or a KK 6, in an XOR operation. Obfuscation differs from encryption in that the key used in the XOR operation is a reusable key, as opposed to a true OTP key 2, which is not reusable.

"N-byte condition" means the requirement that no consecutive n bytes are repeated within a KK 6, wherein n is a positive integer at least equal to 2.

"OTP (one time pad) encryption system" means an encryption system in which the encryption and decryption are performed by an XOR operation, and the encryption/decryption key (OTP key 2) is used just once and then discarded.

"OTP engine" 10 means a module, which may be implemented in any combination of hardware, software, and/or firmware, that performs the functions of the OTP encryption system. When implemented in software, the module can be embodied in any computer-readable medium or media, such as computer memory, hard disks, floppy disks, optical disks, etc.

"OTP key" 2 is a key that is used for encryption and decryption in an OTP encryption system. The OTP key 2 is used just once and then discarded.

"Reusable key," or "revolving key," is a key that is used in an XOR operation and can be reused, by means of using adjacent portions of the key in turn, and when the end of the key is encountered, recommencing with the beginning of the key.

"Sliding algorithm" means an algorithm that applies a window having a fixed number of bytes sequentially against an item being examined, such as a key offset, and that performs a comparison at each sequential step between the contents of the fixed length window and the item being examined.

"XOR (exclusive OR)" means a Boolean operation in which the combination of a zero and a zero yields a zero; the combination of a one and a one yields a zero; the combination of a zero and a one yields a one; and the combination of a one and a zero yields a one.

AutoKey and KernelKey

The AutoKey 4 and KernelKey 6 that are described herein can be used in any OTP encryption system, such as the Alpha-Cipher Encryption System manufactured by Vadium Technology, Inc. of Tacoma, Wash.

Figure 3:
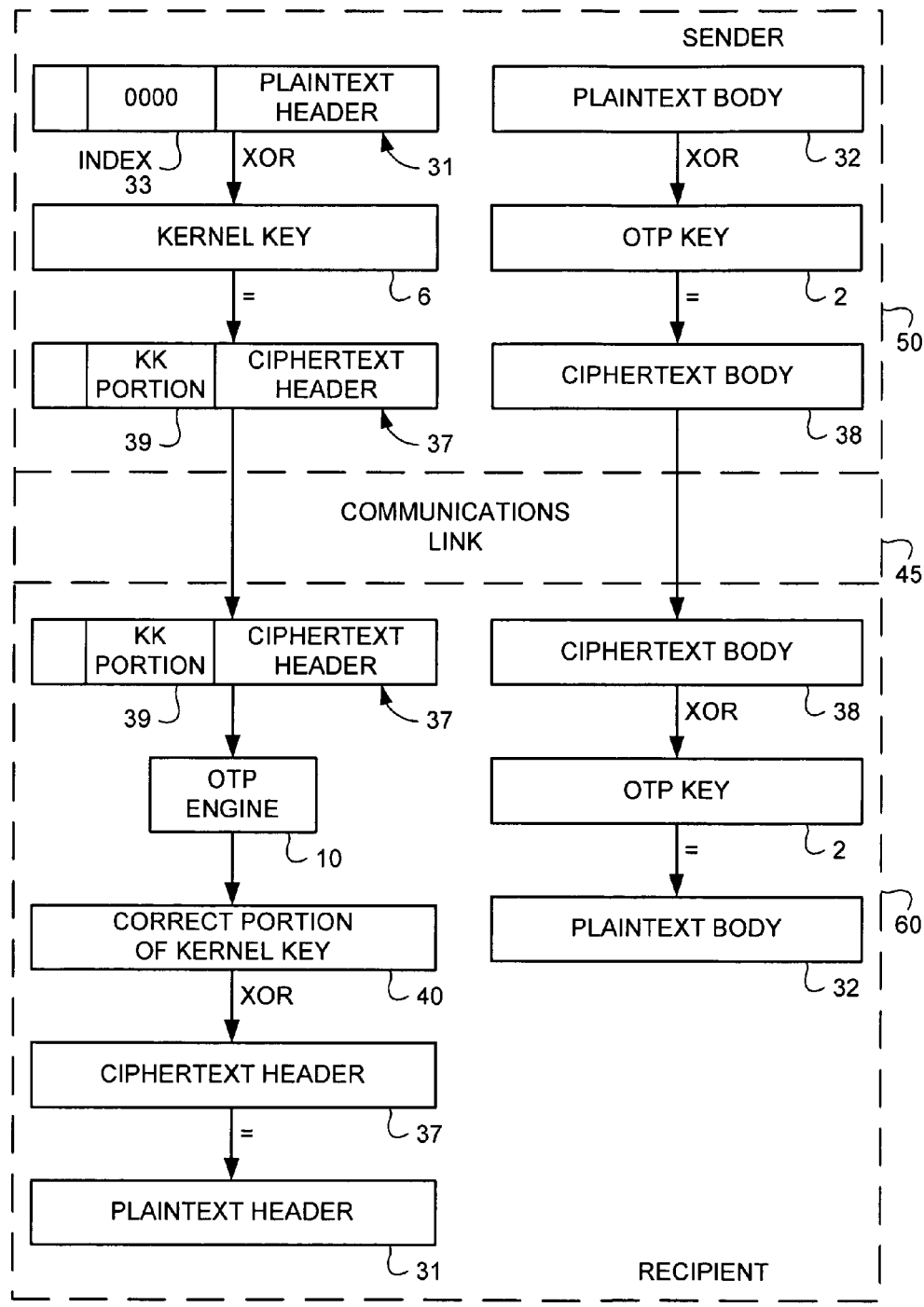
FIG. 3 is an illustration of a second application of KernelKey 6, as well as a general illustration of the functioning of a one-time pad encryption system.

The basic operation of an OTP encryption system is illustrated in FIG. 3. An OTP engine controlled by sender 50 obfuscates plaintext header 31 using KernelKey 6 to produce ciphertext header 37, and encrypts plaintext body 32 using OTP key 2 to produce ciphertext body 38. The ciphertext header 37 and ciphertext body 38 are then sent over a communications link 45 to recipient 60. Link 45 can be any communications link, such as the Internet, a modulated radio signal, semaphore, etc. An OTP engine 10 controlled by recipient 60 then de-obfuscates ciphertext header 37 using KernelKey 6 to recover plaintext header 31, and decrypts ciphertext body 38 using OTP key 2 to recover plaintext body 32.

Both AutoKey 4 and KernelKey 6 comprise a truly random sequence of bytes, similar to any truly random OTP key 2, but differ from an OTP key 2 in that they are reusable. The length of AutoKey 4 and KernelKey 6 can be any size; the longer they are, the more secure they become. Neither AutoKey 4 nor KernelKey 6 detracts from the operation of the OTP encryption as performed by OTP key 2.

AutoKey 4 and KernelKey 6 are revolving keys, meaning that when the end of the key sequence is reached, the sequence starts over from the beginning. The OTP engine 10 controlled by sender 50 keeps track of the portion of AK 4 or KK 6 that has been used, and therefore the portion that should be used in the subsequent obfuscation performed by AK 4 or KK 6.

KK 6 has a special condition that it must meet: any consecutive n bytes in KK 6 must appear only once in that instance of KK 6, wherein n is a positive integer at least equal to 2. This condition is referred to herein as the "n-byte condition." In a preferred embodiment, n=4. This condition limits the length of KK 6; the larger the value of n, the less severe the length limitation. The reason for having this n-byte condition on KK 6 is that it enables an engine 10 to find any n byte sequence easily and uniquely within KK 6, as described below. A quality assurance computer program has been designed to pre-qualify a random series of bytes to meet this condition before it can be used as a KK 6. This quality assurance computer program truncates the series just before the n bytes repeat.

Figure 2:
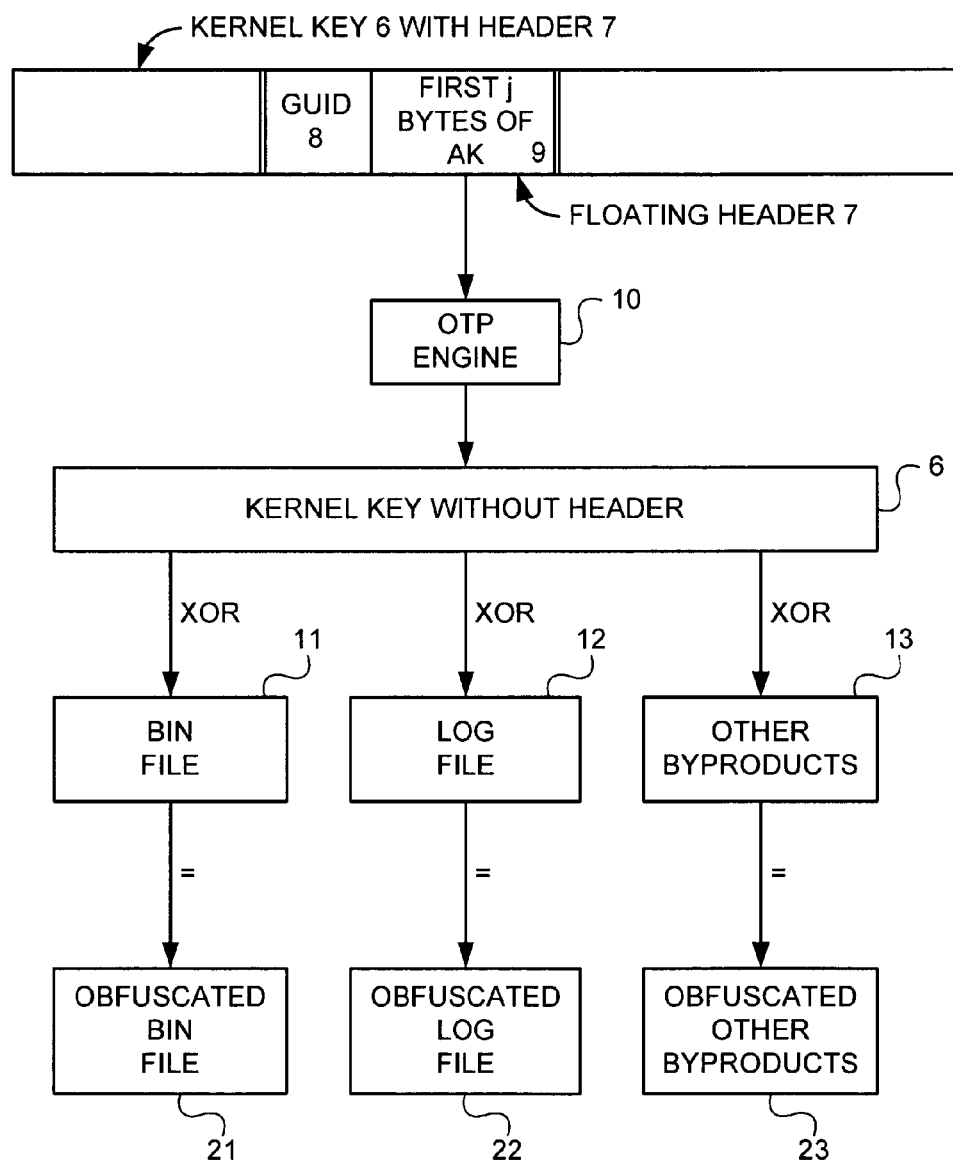
FIG. 2 is an illustration of a first application of KernelKey 6.

As illustrated in FIG. 2, KK 6 contains a floating header 7 for unique identification purposes. This floating header 7 is positioned randomly within the random series of bytes used as KK 6. Floating header 7 is removed by OTP engine 10 before KK 6 is used for its intended obfuscation purposes. OTP engine 10 has been informed where floating header 7 is positioned within KK 6, and uses that information to extract the floating header 7 from KK 6.

Floating header 7 comprises a GUID 8 and a section 9 comprising the first j bytes of AK 4, where j is a positive integer. In a preferred embodiment, j=16. GUID 8 uniquely identifies that KK 6. Section 9 enables a unique linkage between KK 6 and the AK 4 for that customer. Header 7 is exempt from the n-byte condition, because header 7 is not considered to be part of KK 6 per se.

Figure 1:
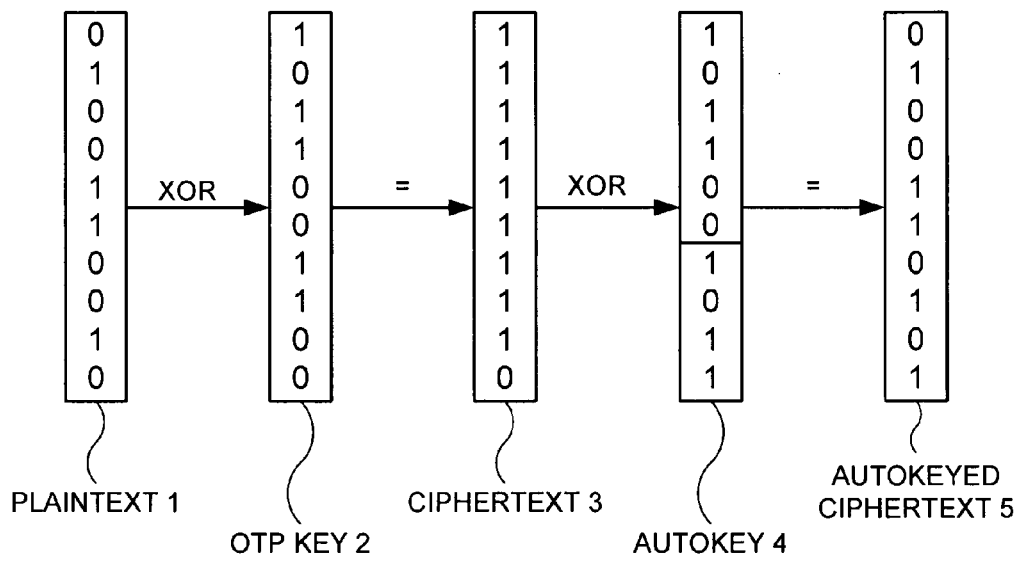
FIG. 1 is an illustration of a first application of AutoKey 4.

A first purpose of AK 4 is illustrated in FIG. 1, namely, the obfuscation of ciphertext 3 to produce AutoKeyed ciphertext 5 after ciphertext 3 has been produced by XORing plaintext 1 with OTP key 2. In FIG. 1, the horizontal bar within AutoKey 4 reminds the viewer that AutoKey 4 is a repeating key. This obfuscation step is performed so that the decryption/de-obfuscation of the resulting AutoKeyed ciphertext 5 requires the possession of both OTP key 2 and AutoKey 4. If the OTP key 2 is stolen, the thief would still need AutoKey 4 to retrieve the plaintext 1. The thief could recover AutoKey 4, because AutoKey 4 is a repeating key, but it would require an extreme amount of work.

A second purpose of AK 4 is to tie a particular installation of the OTP encryption system to a unique set of OTP keys 2. This tying is achieved in that each OTP key 2 contains a floating header that is obfuscated by KK 6, and KK 6 is linked to AK 4 as described above. The effect of this tying is to prevent the unauthorized use of one customer's OTP keys 2 by another customer who is using the same OTP encryption system.

The uses of KK 6 are more varied than those of AK 4. A first application of KK 6 is illustrated in FIG. 2. After the floating header 7 has been removed from KK 6 by engine 10, KK 6 can be used to obfuscate any and all byproducts of the OTP encryption, including, but not limited to, bin file 11, log file 12, and other byproducts 13. This obfuscation, which is performed using an XOR procedure as indicated above, produces obfuscated bin file 21, obfuscated log file 22, and obfuscated other byproducts 23, respectively. A bin file 11 is a binary file produced by certain OTP encryption systems, such as the AlphaCipher Encryption System manufactured by Vadium Technology, Inc. of Tacoma, Wash., and is used for storing user preferences. A log file 12 is used by certain OTP encryption systems, such as the AlphaCiper Encruption System manufactured by Vadium Technology, Inc. of Tacoma, Wash., and contains information as to the purpose or purposes of the OTP encryption. Other byproducts 13 can be any other byproducts of OTP encryption produced by any OTP encryption system. Obfuscating bin file 11, log file 12, and other byproducts 13 advantageously makes it harder for nefarious individuals to eavesdrop on the encrypted communications.

Both AK 4 and KK 6 are used as constants within an organization, enterprise, or communications group. There is a limitation on this constancy, in that one or both of AK 4 or KK 6 may be lost, stolen, or corrupted. In this case, AK 4 and KK 6 must be replaced or replenished.

Normally, there is one set of OTP keys 2, one AK 4, and one KK 6 (collectively, "group") per customer. It is possible for there to be several groups per customer, but this would prevent communications from one group to another group. It is also possible for there to be one KK 6 and several AKs 4 per customer, but again the subgroups within the customer having separate AKs 4 would not be able to communicate with each other. In this latter embodiment, let us assume that there are m AKs, where m is a positive integer at least equal to 2. Then there are m KKs, all identical except for a different header 7. Each header 7 has the same GUID 8 but a different AK portion 9, so that all m of the AKs are pointed to by the set of m KKs. Then after the headers 7 are stripped from the KKs by engine 10, there is just one unique KK 6.

A second use of KK 6 is illustrated in FIG. 3. It is typical in an OTP encryption system for the plaintext 1 to consist of a plaintext body 32 and a conjoined plaintext header 31. Body 32 contains the substantive portion of the message 1 that is to be encrypted. Header 31, which typically appears at the beginning of plaintext 1, contains information that is useful in the decryption process. Such information can include the identity of the intended recipient 60, the length of plaintext body 32, the identity of an OTP key 2, and the key offset for said OTP key 2. Body 32 is encrypted by OTP key 2 using an XOR procedure, to produce ciphertext body 38. Plaintext header 31 is obfuscated by KernelKey 6 (after the floating header 7 has been removed from KK 6 by the sender's engine 10), to produce ciphertext header 37. The reason that header 31 is obfuscated is so that attackers will not be able to get access to said useful information.

In the present invention, the ciphertext header 37 is de-obfuscated without the use of a key identifier or key offset, using a special indexing system that takes advantage of the n-byte condition of the KK 6 defined above. This indexing technique works as follows: plaintext header 31 contains a unique n-byte index 33 that has been carved out of KK 6. Index 33 is always in the same location within plaintext header 31, and therefore each OTP engine 10 knows where to find index 33. Index 33 is initially set to zero (all of its bits are zeroes). When plaintext header 31 is obfuscated by KK 6, whatever is present within KK 6 at the same relative location as index 33 is carried over into a corresponding KK portion 39 within ciphertext header 37, due to the very nature of the XOR operation, i.e., a zero XORed with any given bit yields that bit. In a subsequent step, the OTP engine 10 of the recipient 60 goes to KK portion 39 to find the starting point of the portion 40 of KK 6 that was used in the obfuscation and hence must be used in the de-obfuscation. (In any OTP process, the same portion of the key must be used for the decryption (or de-obfuscation) as was used for the encryption (or obfuscation)). Because of the n-byte condition, we know that this portion 40 of KK 6 is unique. Therefore, we know that the de-obfuscation will be performed correctly. This de-obfuscation consists of the correct portion 40 of KK 6 being XORed with ciphertext header 37 to recover plaintext header 31.

Variable Persistent Headers

The material herein pertaining to variable persistent headers applies equally to KK headers 7 and plaintext headers 31, but for purposes of ease of illustration, the following discussion is directed to plaintext headers 31. In order for header 31 to perform its various functions, at least some of header 31 must persist (carry over from sender 50 to recipient 60). Traditionally, header 31 has been written in such a way that it could be expanded should the need arise in the future to include additional data, such as, for example, biometric information pertaining to the holder of the OTP key set 2. This has traditionally been done by using a size counter, wSize, as the first data member (field) of header 31, indicating the length of header 31. This allowed for the definition of a header 31 with known data members, with the possibility of adding more data members to the end of the data structure comprising header 31 as needed. This principle is illustrated in the following C language example:

```
struct
{
    WORD        wSize;
    WORD        wDay;
    WORD        wMonth;
    WORD        wYear;
} DATE_STRUCT
```

DATE_STRUCT defines storage for a date as it would be persisted on a computer-readable medium of the recipient 60. The wSize member variable should be preset to be equal to the size of DATE-STRUCT. If, in the future, the structure needed to be expanded while backward-supporting the original DATE_STRUCT, a new structure with the first few data members being identical to DATE_STRUCT would have to be created, as shown below:

```
struct
{
    WORD        wSize;
    WORD        wDay;
    WORD        wMonth;
    WORD        wYear;
    WORD        wHour;
    WORD        wMinute;
    WORD        wSecond;
} DATE_TIME_STRUCT
```

In this second example, the wSize member variable is preset to equal the size of DATE_TIME_STRUCT. With these two data structures in place, the old data structure could be distinguished from the new data structure by examining the value of the wSize member variable, as it would indicate whether additional information was present. While this method has been used frequently, it has drawbacks. Suppose, at a later date, the data structure needed to be expanded to, for example, keep track of the number of days since January $1^{st}$ of the current year. The only place to add this information would be at the end of the data structure, so a third DATE_TIME_STRUCT definition would be required. As another example, suppose that it was no longer necessary, at a later date, to keep track of the year. Yet another data structure would be needed to eliminate the data member wYear. These data structures are static and are therefore nearly impossible to change once they have been released to the public. This creates a housekeeping problem and wastes processing cycles.

From a security standpoint, there is another problem with the static headers of the prior art. Suppose that a 64-bit number is used as a key offset for OTP key 2, and that the key offset is stored within header 31. When the OTP key 2 is used for the first time, the key offset will be zero. Since a zero XORed with any value will return the XORed value, a sliding algorithm could be used by an attacker (who might intercept the header as it traverses the communications link 45) to reliably detect the section of the OTP key 2 that the rest of the information around the offset was encrypted with, thereby weakening security.

The present invention solves these problems caused by static headers by using a header 31 where the first member variable (wFlags) consists of a set of flags that determine the contents of the rest of the header 31 as it is persisted. An example of a DATE_TIME_STRUCTURE using the present invention is:

```
struct
{
    WORD        wFlags;
    WORD        wDay;
    WORD        wMonth;
    WORD        wYear;
    WORD        wHour;
    WORD        wMinute;
    WORD        wSecond;
} DATE_TIME_STRUCT
```

In the above DATE_TIME_STRUCT, wFlags is an arbitrary number of bits long. Each bit of wFlags represents a different member variable in the remainder of the data structure. In an alternative embodiment, a given bit within wFlags represents more than one data member, such as the combination "wDay wMonth wYear." The meaning of the bits within wFlags is agreed to in advance by sender 50 and recipient 60 according to a set of rules ("convention" or "persist code"). Let us assume that the initial value of wFlags is established by sender 50 as 110110. Let us further assume that the convention stipulates that these six bits within wFlags refer to wDay, wMonth, wYear, wHour, wMinute, and wSecond, respectively. Thus, wFlags contains six individual one-bit flags. Flags 1, 2, 4, and 5 are "set" (have a value of 1), and flags 3 and 6 are "cleared" (have a value of 0). This means that sender 50 wishes for the values of wDay, wMonth, wHour, and wMinute to persist, and for the values of wYear and wSecond to not persist. The reason for wanting to persist only certain variables and not others is to save processing time and space. For example, sender 50 might have concluded that wYear is not important, because all of the communications are going to take place in the same year, and that wSecond is not important, because the messages 38 don't need to be tracked with that level of specificity. When the recovered persisted plaintext header 31 is read into a computer-readable medium of recipient 60 for processing by OTP engine 10, the first field that is read in is wFlags, which can then be used to read in the rest of the persisted header 31. Data is typically read in a word (i.e., two bytes) at a time. At the end of each word, a bit can be used to inform recipient's engine 10 as to whether additional portions of wFlags are present and therefore must be read in. In the case of a flag that has been cleared, engine 10 will assign a default value to that particular member variable. The defaults can be different for the different data members, according to the convention. For example, wYear can default to the current year, and wSecond can default to zero. If a flag has been set, the corresponding member variable is initialized with the value in the persisted header 31.

In the above method, the order of member variables depends upon the pre-selected convention. For example, it is possible to persist wHour before wDay. To not persist a member variable, its flag is cleared; and to add a new member variable, it is not necessary to append it to the end of the data structure, since the convention is customizable. The convention can be changed after the OTP encryption system has been initially deployed, e.g., by sending a software patch to sender 50 and recipient 60 changing the mapping of the flag bits to the data members.

When the OTP encryption system is first deployed, modules containing OTP keys 2, OTP engines 10, and conventions pertaining to wFlags are distributed to the prospective senders 50 and recipients 60. These modules can be implemented in any combination of hardware, firmware and/or software. When implemented in software, the modules can be embodied in any computable-readable medium or media, such as computer memory, hard disks, floppy disks, optical disks, etc. The initial convention for wFlags can specify that a certain subset of bits within wFlags is reserved for future use. The recipient's engine 10 encountering the value of 1 in any of these bits will try to process the bit, but conclude it cannot do anything with it. Later, after a patch has been sent out to sender 50 and recipient 60 amending the convention to define the significance of this bit within wFlags, the recipient's engine 10 will be able to process said bit.

A portion of header 31 is normally devoted to the key offset for OTP key 2. Let us assume that the key offset is 64 bits long. During the early stages of life of OTP key 2, the beginning portions of the key offset will be zero. Sending these initial zeroes over communications link 45 wastes processing cycles, and presents a security risk, since an attacker could use a sliding algorithm against the key offset portion to undesirably obtain information as to which portion of KK 6 was used in the obfuscation of the key offset portion of plaintext header 31. As a solution to this problem, one or more bits within wFlags can be devoted to indicating a portion of the key offset that is persisted. For example, flags within wFlags could be used to indicate whether 8 bits, 16 bits, 32 bits, or 64 bits of the key offset are persisted.

In summary, the use of flags as described above allows great flexibility in persisting information contained within header 31. The information that is persisted is determined by flags within wFlags, and the order in which the information is used is customizable for the particular application, and can be changed, as long as both the sender 50 and the recipient 60 are informed of the convention being used.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-readable set of data comprising a variable persistent header for use in a computer-implemented communications system, said header comprising:
    a plurality of fields containing information useful in processing a message that is associated with the header, said plurality of fields being located independently of the location of the message and not containing any synchronization information regarding the location of the header vis-à-vis the location of the message; wherein:
    one of the fields comprises a set of flags indicating which of said other fields are persisted from a sender of the message to a recipient of the message; and
    the length of the header varies from one message to a subsequent message.

2. The header of claim 1 wherein at least one of the fields contains information pertaining to:
    identity of an intended recipient of the message;
    length of the message;
    identity of a one-time pad (OTP) key used to encrypt the message; or
    key offset of said OTP key, given as a number of bits of a starting point within the OTP key, for use in decrypting the message.

3. The header of claim 1 wherein the header is contained within an obfuscation key that is used to perform at least one of the following two tasks:
    obfuscate byproducts of encryption;
    obfuscate the header.

4. The header of claim 1 wherein there is a one mapping between at least one flag and one field other than the flag field.

5. The header of claim 1 wherein there is a one-to-many mapping between at least one of the flags and at least two fields other than the flag field.

6. The header of claim 1 wherein meanings of the flags are agreed to by a sender of the message and a recipient of the message prior to the message being sent from the sender to the recipient.

7. The header of claim 6 wherein meanings of the flags can be changed after the message has been sent, and before a subsequent message is sent.

* * * * *